(12) United States Patent
Walvekar et al.

(10) Patent No.: US 11,085,611 B2
(45) Date of Patent: Aug. 10, 2021

(54) TRACKING LIGHTING SYSTEM

(71) Applicant: Board Of Supervisors Of Louisiana State University And Agricultural And Mechanical College, Baton Rouge, LA (US)

(72) Inventors: Rohan Walvekar, New Orelans, LA (US); Jin-Woo Choi, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 27 days.

(21) Appl. No.: 16/623,177

(22) PCT Filed: Jun. 13, 2018

(86) PCT No.: PCT/US2018/037182
§ 371 (c)(1),
(2) Date: Dec. 16, 2019

(87) PCT Pub. No.: WO2018/231887
PCT Pub. Date: Dec. 20, 2018

(65) Prior Publication Data
US 2021/0140608 A1    May 13, 2021

Related U.S. Application Data

(60) Provisional application No. 62/520,012, filed on Jun. 15, 2017.

(51) Int. Cl.
F21V 14/02 (2006.01)
H05B 47/125 (2020.01)
(Continued)

(52) U.S. Cl.
CPC ............ *F21V 14/02* (2013.01); *F21V 21/084* (2013.01); *F21V 21/116* (2013.01); *F21V 21/28* (2013.01); *H05B 47/125* (2020.01); *H05B 47/19* (2020.01); *F21W 2131/205* (2013.01); *F21Y 2115/10* (2016.08)

(58) Field of Classification Search
CPC ...... F21V 14/02; F21V 21/084; F21V 21/116; F21V 21/28; H05B 47/125; H05B 47/19; F21Y 2115/10
See application file for complete search history.

(56) References Cited

U.S. PATENT DOCUMENTS

2016/0248971 A1*  8/2016  Tall .................... H04N 5/23219
2019/0059723 A1*  2/2019  Ono ....................... A61B 3/152

* cited by examiner

*Primary Examiner* — Anne M Hines
(74) *Attorney, Agent, or Firm* — Baker Donelson

(57) ABSTRACT

Provided are embodiments of a position-adaptive lighting system comprising a pantilt adjustable housing enclosing a digital imaging system and a lens module operably connected to a computer-based digital control unit, a lamp, and a position indicator detectable by the digital camera system and the computer-based digital control unit. The position-adaptive lighting system can adjustably direct a light beam to provide illumination of an object to which the position indicator is attached. The system is advantageous for providing a directed light to a surgical site and accommodate the movement of the position indicator on a surgeons hand or instrument.

22 Claims, 12 Drawing Sheets

(51) Int. Cl.
*F21V 21/28* (2006.01)
*F21V 21/084* (2006.01)
*H05B 47/19* (2020.01)
*F21V 21/116* (2006.01)
*F21W 131/205* (2006.01)
*F21Y 115/10* (2016.01)

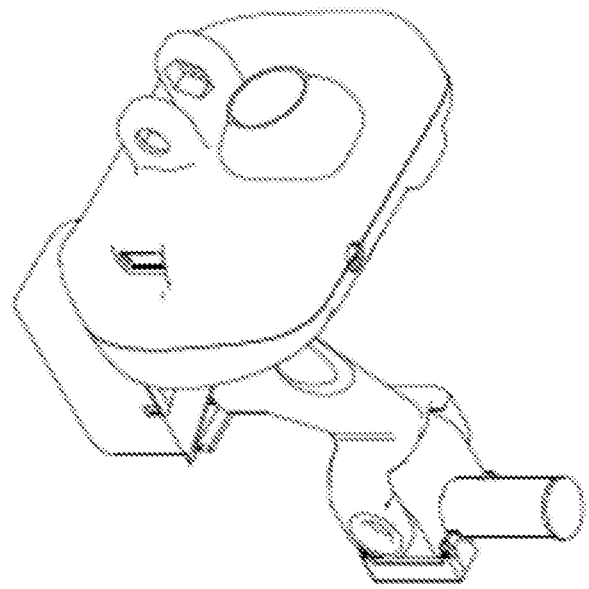
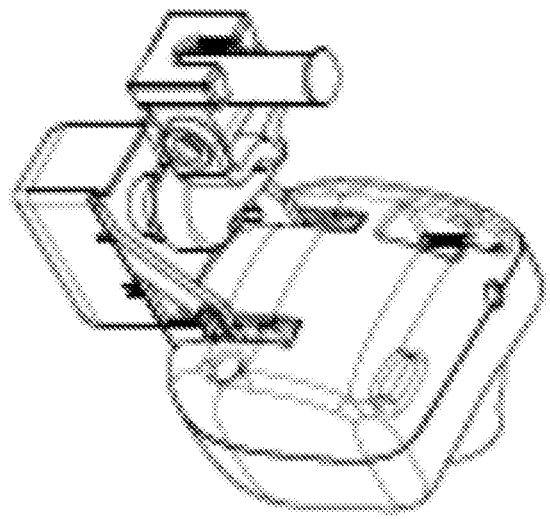
Fig. 3

TRACKING LIGHTING SYSTEM

CROSS-REFERENCE TO RELATED APPLICATIONS

This application claims priority to and the benefit of U.S. Provisional Application 62/520,012 titled "TRACKING LIGHTING SYSTEM" filed Jun. 15, 2017, the entire disclosure of which is incorporated herein by reference in its entirety.

TECHNICAL FIELD

The present disclosure is generally related to a position adaptable lighting system for directing illumination to an external trackable moving object.

BACKGROUND

In situations such a surgical procedure, a strong and constant illumination is required. Current lamp systems for the surgical theater are typically immobile and, therefore once adjusted to a fixed point cannot be moved unless they are manually readjusted. Fixed lighting systems may also result in blocking of the light by, for example, the surgeon such that the work area requiring the light is now in shadow. Furthermore, the intensity of the light required by surgical procedures necessitates using lights that emit high levels of heat that can be damaging to the patient and of extreme discomfort to anyone working under such illumination.

To some extent shadowing of the illuminating light may be reduced or avoided by attaching a lamp to the head of the operator. However, such a system requires that the lamp be maneuvered by head movements when the object to be illuminated moves or readjusted by hand, which introduces the possibility of transmitting contaminating microorganism to a patient undergoing a surgical procedure. A need exists, therefore, for a system that allows for the illumination of a target object or area even in the event that a targeted object moves.

SUMMARY

Embodiments of the present disclosure provide a tracking lamp system comprising: a digital imaging system enclosed in a pan-tilt adjustable housing operably connected to a first panning-tilting mechanism, the digital imaging system comprising a digital image sensor and a lens module, wherein the lens module comprises at least one lens, wherein the digital imaging system and the first panning-tilting mechanism can be operably connected to a computer-based digital control unit; a lamp fixedly mounted on the pan-tilt adjustable housing and positioned to direct a light beam to intersect the optical axis of the lens of the digital imaging system or fixedly mounted on a second panning-tilting mechanism not attached to the pan-tilt adjustable housing; and a position indicator recognizable by the computer-based digital control unit, wherein the computer-based digital control unit can be configured for processing digital data from the digital imaging sensor to generate a digital image, recognizing a position indicator within the digital image, directing the optical axis of the lens to intersect the position indicator by pan-tilt adjusting the pan-tilt adjustable housing, and optionally storing the digital image or video generated by the computer-based digital control unit.

In some embodiments of this aspect of the disclosure, at least one of the shape and color of the position indicator can be recognizable by the computer-based digital control unit.

In some embodiments of this aspect of the disclosure, the position indicator can be on a finger or a tool desired to be tracked.

In some embodiments of this aspect of the disclosure, the position indicator can provide a light signal recognizable by the computer-based digital control unit.

In some embodiments of this aspect of the disclosure, the position indicator can be at least one LED light.

In some embodiments of this aspect of the disclosure, the position indicator can be at least one LED light emitting near infra-red light detectable by the digital imaging system.

In some embodiments of this aspect of the disclosure, the pan-tilt adjustable housing can comprise a near infra-red light emitter configured to illuminate the position indicator recognizable by the computer-based digital control unit.

In some embodiments of this aspect of the disclosure, the lens of the digital imaging system can be non-adjustable.

In some embodiments of this aspect of the disclosure, the lens of the digital imaging system can be adjustable to change at least one of the focal point and the focal length.

In some embodiments of this aspect of the disclosure, the lamp can be focusable to concentrate light emitted from the lamp to a position distant from the pan-tilt adjustable housing.

In some embodiments of this aspect of the disclosure, the tracking lamp can further comprise a mounting for attaching the pan-tilt adjustable housing and the first panning-tilting mechanism to a headband.

In some embodiments of this aspect of the disclosure, the tracking lamp system can further comprise a mounting for attaching the pan-tilt adjustable housing and the first panning-tilting mechanism to a support stand.

In some embodiments of this aspect of the disclosure, the support stand can be wall-mounted.

In some embodiments of this aspect of the disclosure, the support stand can be a floor stand.

In some embodiments of this aspect of the disclosure, the lamp can be operably connected to the computer-based digital control unit.

In some embodiments of this aspect of the disclosure, the lamp can be operably wirelessly connected to the computer-based digital control unit.

In some embodiments of this aspect of the disclosure, the lamp can be mounted to a second panning-tilting mechanism not attached to the pan-tilt adjustable housing, and wherein the second panning-tilting mechanism can be pan-tilt adjustable in response to the computer-based digital control unit.

In some embodiments of this aspect of the disclosure, the lamp can be focusable in response to the computer-based digital control unit.

Another aspect of the disclosure encompasses embodiments of a computer-implemented method for directing a tracking light, comprising: generating a digital image file of a detectable indicator with a client digital imaging system enclosed in a pan-tilt adjustable housing; receiving a media file from a client digital imaging system; identifying an image of a detectable indicator within the field of view of the digital imaging system; determining the detected horizontal difference between the detected indicator and the center of the digital imaging system field of view; directing a panning mechanism to pan the pan-tilt adjustable housing to reduce said determined horizontal difference to below a threshold value; determining the detected vertical difference between the detected indicator and the center of the digital imaging system field of view; and directing a tilting mechanism to tilt the pan-tilt adjustable housing to reduce said determined vertical difference to below a threshold value, thereby directing the lamp to illuminate the detected indicator.

In some embodiments of this aspect of the disclosure, the lamp can be mounted on the pan-tilt adjustable housing, thereby panning and tilting with the digital imaging system.

In some embodiments of this aspect of the disclosure, the lamp can be moveable relative to the pan-tilt adjustable housing to the digital camera, said method further comprising the steps of: determining the detected horizontal difference between the detected indicator in the center of the digital imaging system field of view and the light from the lamp; directing a panning mechanism to pan the lamp to reduce said determined horizontal difference to below a threshold value; determining the detected vertical difference between detected indicator the in the center of the digital imaging system field of view and the light from the lamp; and directing a tilting mechanism to tilt the lamp to reduce said determined vertical difference to below a threshold value, thereby directing the lamp to illuminate the detected indicator.

In some embodiments of this aspect of the disclosure, the step of identifying the detectable indicator can comprise identifying at least one of the shape, the color, an emitted light, or a reflected light of the indicator.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 3 illustrates a back (left) and a front view (right) of an embodiment of the pan-tilt adjustable housing of the disclosure.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Figure 1:
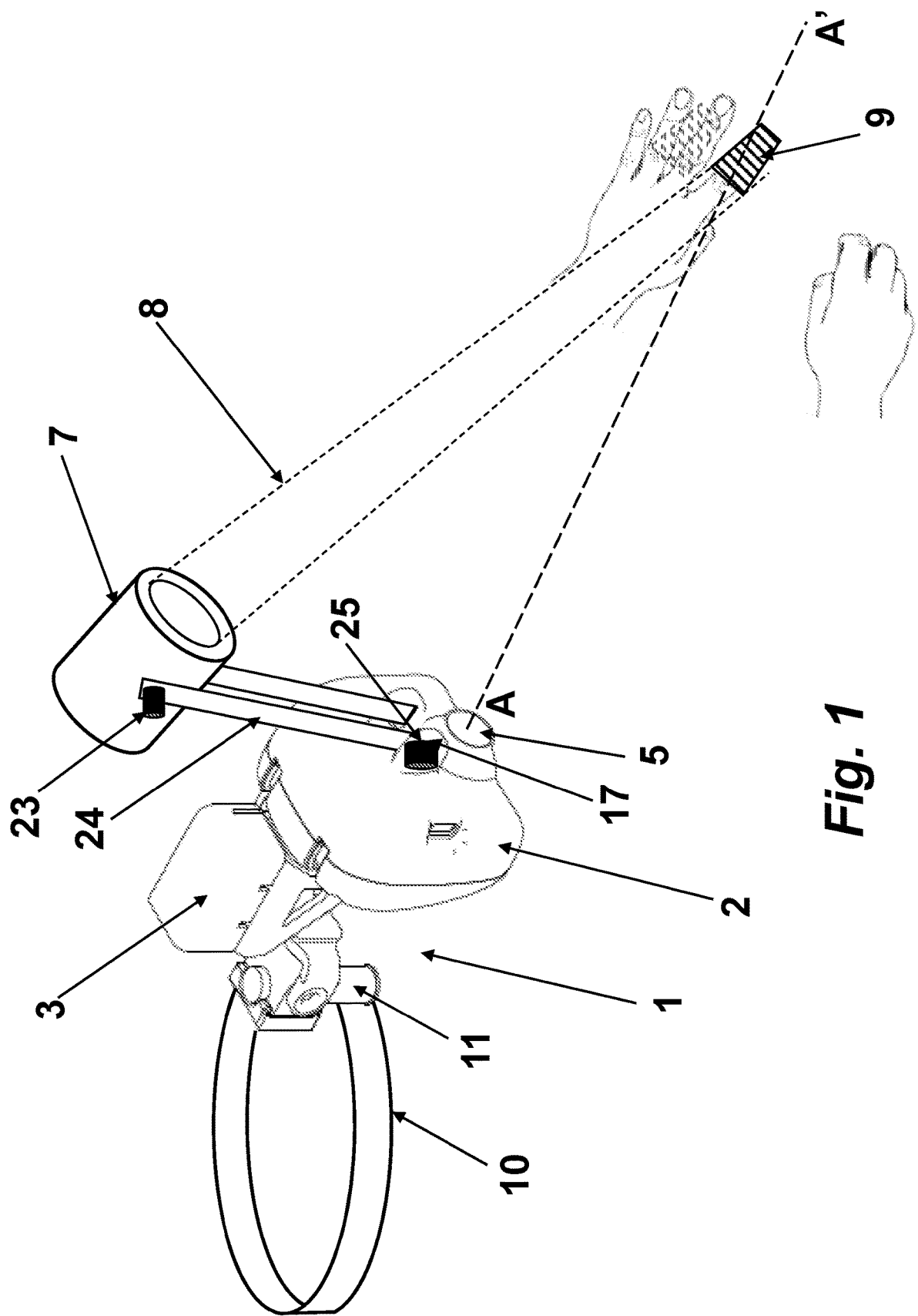
FIG. 1 illustrates an embodiment of a tracking lighting system of the disclosure mounted to a headband.

Referring now to FIG. 1, shown is an embodiment of a position-adaptive lighting system 1 comprising a pan-tilt adjustable housing 2 operably connected to a first pan-tilt mechanism 3 and enclosing a digital imaging system comprising a digital image sensor 4 and a lens module 5, wherein the lens module 5 comprises at least one lens and wherein the lens can be fixed or be operably attached to a focusing mechanism, a computer-based digital control unit 16, wherein the first pan-tilt mechanism 3 and the digital camera system are operably connected to the computer-based digital control unit 16. A lamp 7 can be mounted on the pan-tilt adjustable housing 2. Further included within the pan-tilt adjustable housing 2 can be a power source that can provide electrical power for the operation of the position-adaptive lighting system 1 although in some embodiments an external power source may be provided. The position-adaptive lighting system 1 of the disclosure further comprises a position indicator 9 detectable by the digital camera system and the computer-based digital control unit 16.

The pan-tilt adjustable housing 2 as shown in FIG. 1 may be of any shape and size that may enclose the digital camera system, the computer-based digital control unit 16, and a geared servo moto system 22 adapted for tilting the housing 2. Preferably, the housing may be serializable while maintaining the operating integrity of the unit, or may be covered with a sterile cover having an aperture for the lens of the lens module 5.

The lamp 7 may be adjusted in a vertical plane to direct a light beam 8 to intersect the optical axis A-A' of a lens of the lens module 5 of the digital camera system at a desired position. Accordingly, the lamp 7 may be mounted on lockable pivots 23 to extension arms 24 that can be mounted by lockable pivots 25 to lamp mounting extensions 17 protruding from the pan-tilt adjustable housing 2. In some embodiments, the lamp 7 to be rigidly attached to, or be integral with, the housing 2 such that the lamp directs a light beam to a predetermined fixed position.

The digital camera system of the position-adaptive lighting system 1 of the disclosure can be a removable unit or the digital pan-tilt adjustable housing 2 is adapted to accept the lens modules 5, image sensor 4, and operably connected to the computer-based digital control unit. Most advantageously, the lens module 5 of the digital camera system can be focusable to provide a focused image of the position indicator 9 on the sensor of the digital camera 4. In some embodiments, the lens of the lens module 5 can be of fixed focal length but having a restricted aperture with an increased depth of focus so as to provide a substantially focused image of the position indicator 9 on the sensor of the digital camera system.

The computer-based digital control unit 16 is configured for processing digital data from the digital camera system to generate a focused digital image, recognizing an image of the position indicator 9 within the digital image, directing the optical axis of the lens to intersect the position indicator 9 by pan-tilt adjusting the housing 2. It is further contemplated that computer-based digital control unit 16 may also be operably connected to a lamp 7 having a focusable lens to provide digital instructions for focusing a light beam onto position indicator 9. Optionally, the computer-based digital control unit 16 may further be configured for storing a digital image or video generated by the computer-based digital control unit of the position indicator and surrounding objects.

Figure 2:
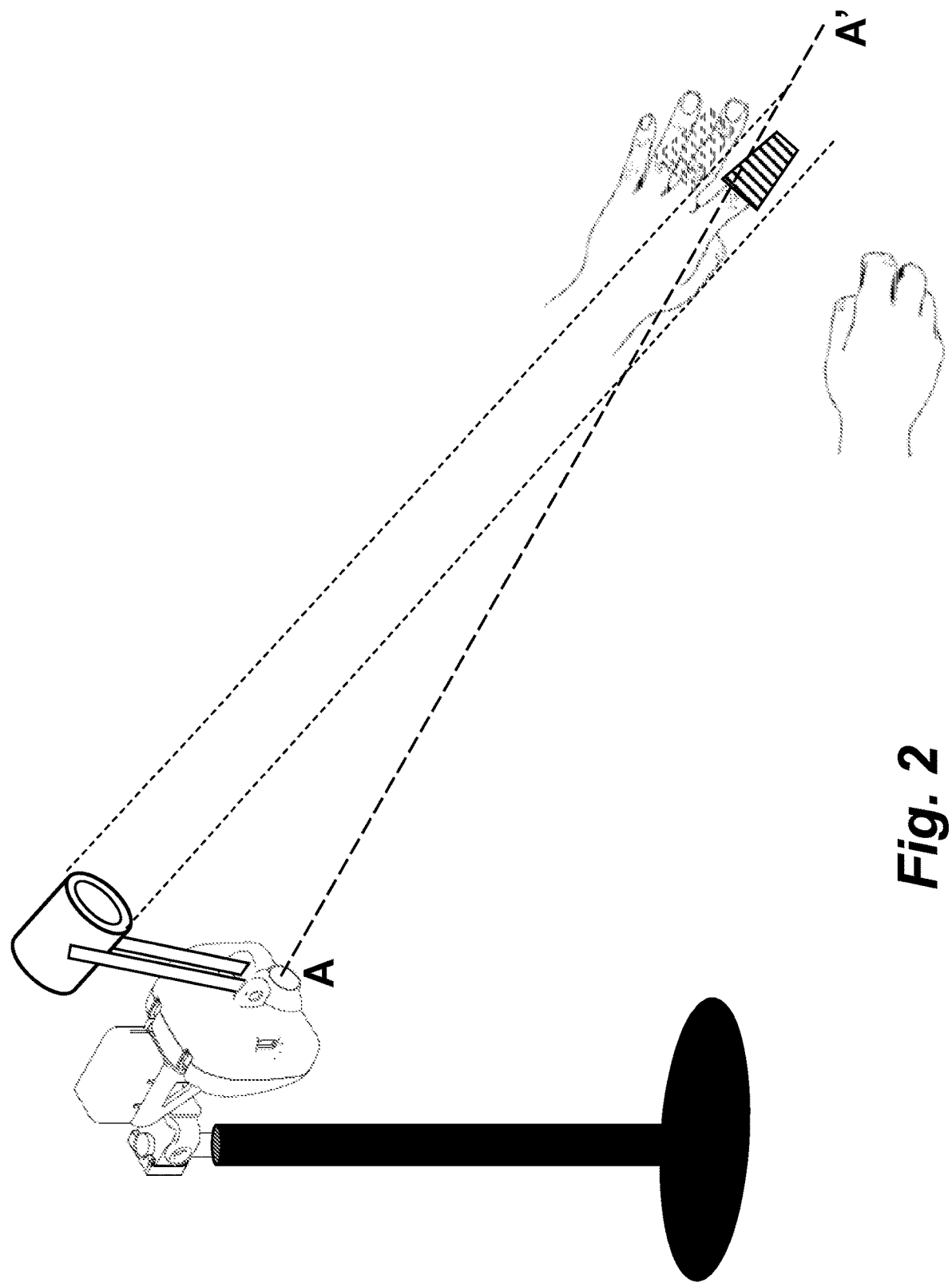
FIG. 2 illustrates an embodiment of a tracking lighting system of the disclosure mounted to a floor stand.

As shown in FIG. 1, embodiments of the pan-tilt adjustable housing 2 of the disclosure may be detachably or securely mounted onto a headband 10 by means of a mounting post 11. Such an embodiment can allow the pan-tilt adjustable digital camera assembly 1 to be worn by a person such as a surgeon desiring to illuminate a moving object including, but not limited to, a hand or a tool. In some embodiments, the pan-tilt adjustable digital camera assembly 1 of the disclosure may be mounted on a stand such as a floor stand as shown, for example, in FIG. 2, or secured to surface such as a wall, ceiling surface, item of furniture, and the like.

Figure 4:
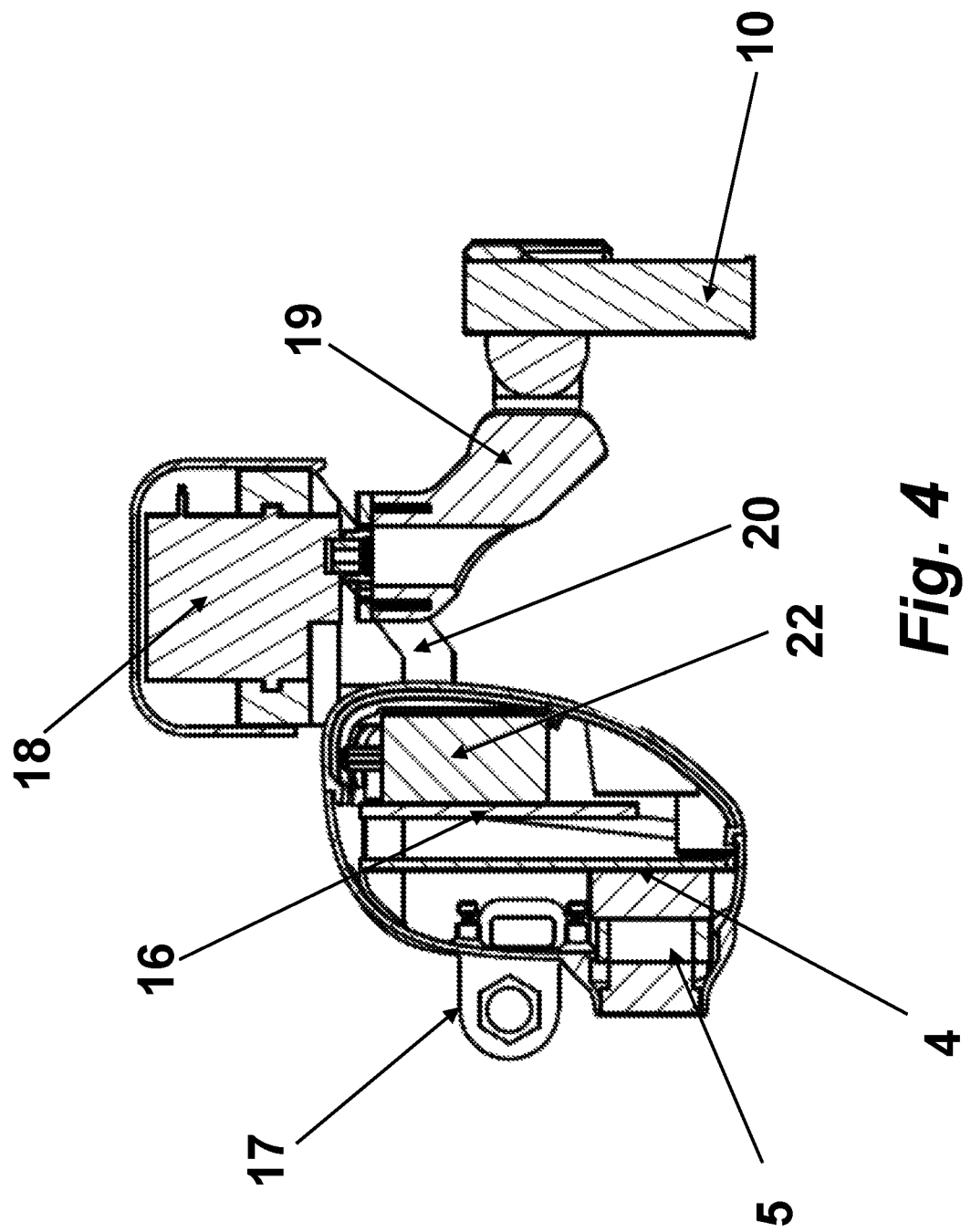
FIG. 4 illustrates a vertical section through an embodiment of the pan-tilt adjustable housing 2 of the disclosure.

Referring now to FIG. 4, shown is a vertical section through the pan-tilt adjustable housing 2. Within the housing 2 is a digital camera system operably connected to the computer-based digital control unit 16 and further comprising a geared servo moto system 22 adapted for tilting the housing 2. The housing 2 is movably attached to a mounting bracket 20 to which is attached a panning geared servo moto system 18 engaged with a support arm 19 to pan the housing 2 in a plane right-angled to the plane of tilting. The support arm 19 is secured to the mounting pole 11.

Figure 5:
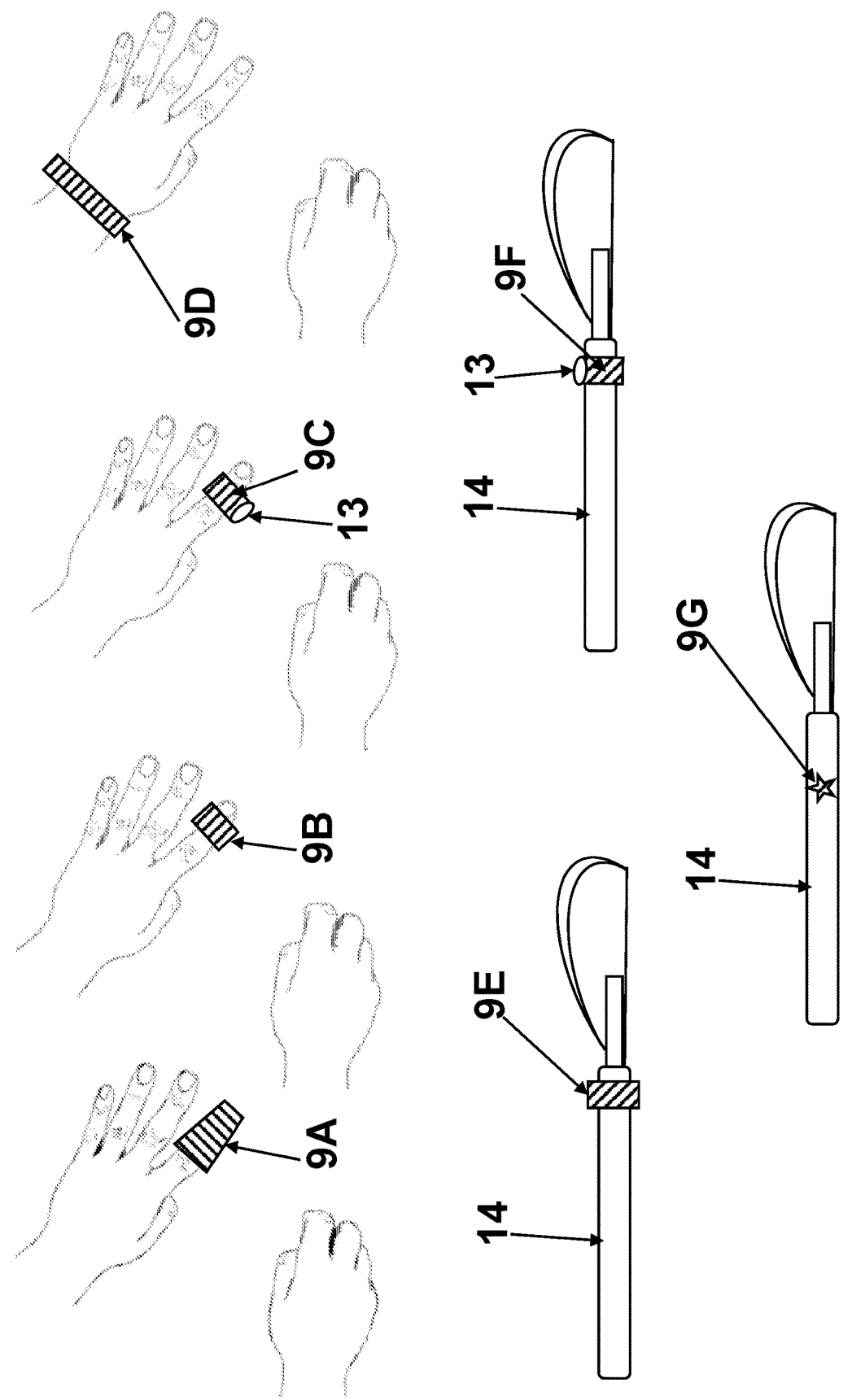
FIG. 5 illustrates embodiments of the positional indicator of the disclosure attached to a hand (top) or a surgical tool.

Referring now to FIG. 5, shown are examples of embodiments 9A-9G of a position indicator 9 according to the disclosure that may be applied, for example, on a finger or wrist of a hand. In some embodiments, the position indicator 9 may be placed on a tool held by the hand. The position indicator 9 can be of any form or color that is identifiable by the computer-based digital control unit 16 from the image data generated by the digital camera system. Some embodiments of the position indicator 9 of the disclosure include a light source 13 such as a light-emitting diode (LED) and a power source operably connected thereto. The light emitted from the light source 13 can be of any wavelength from ultra-violet to infra-red and requires that the digital camera system is adapted for the detection of the emitted light. Advantageously, a near-infra red wavelength may be used that is less visually distractive to an operator. Most advantageously, color, shape or emitted light signal is selected to be distinguishable from the surroundings. For example, in the environment of a surgical operation, the color of the position indicator 9 can contrast with that of blood or an underlying tissue. The position indicator 9 can be, but is not limited to, any configuration, material, and size that would allow the position indicator 9 to be secured to a finger, a hand, a wrist or to a tool held by the hand. For example, but not intended to be limiting, embodiments of the position indicator 9 can be a finger-tip cover 9A as shown in both FIG. 1 and FIG. 5, a ring 9B worn on a finger, a wrist band 9C, or a ring 9D having a light source 13. In embodiments of a position indicator 9 attached to a tool such as a scalpel 14, as shown in FIG. 5, the position indicator 9 can be, but is not limited to, a detachable band 9E, a detachable band 9F having a light source 13 attached thereto, or integrated into the structure of the tool, or a colored or otherwise distinct form 9G printed on the surface of the tool 14. While not intended to be limiting, the position indicator 9 may advantageously be made of a material that may be sterilized for use in the sterile environment of an operating theater, including, but not limited to, heat-resistant polymers and thermoplastics. Some embodiments of the position indicator 9 for placing on a hand, wrist or detachably onto a tool may be formed from an elastic material that with stretching may ensure a secure attachment to a target desired to be tracked by the position-adaptive lighting system 1 of the disclosure, including but not limited to, hand, arm, tool, or the like.

Figure 6:
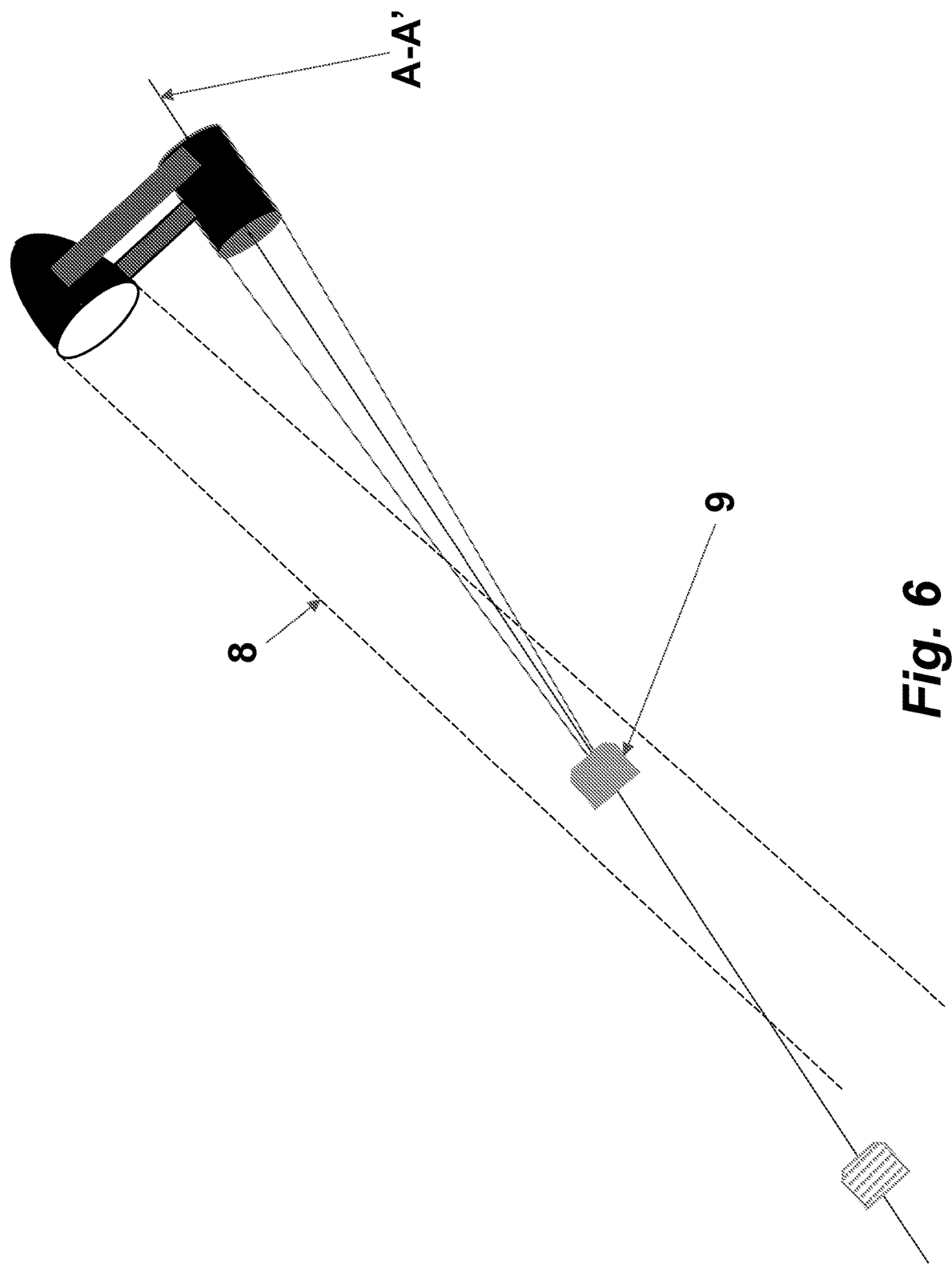
FIG. 6 schematically illustrates a positional indicator of the disclosure at the focal point of the lens of a digital imaging system according to the disclosure and illuminated by the light beam from the lamp attached to the pan-tilt adjustable housing.

As shown in FIG. 6, the embodiments of the light system of the disclosure can be used intended to direct a light beam 8 so as to illuminate, and maintain illumination of, a target hand or a tool by identifying and tracking the target object as it moves relative to the light beam 8. Most advantageously, the position indicator 9 on the targeted object is at the focal point of the lens of the lens module 5 of the digital camera system operably connected to the computer-based digital control unit 16 or within the image area recorded by the digital camera system.

Figure 7A:
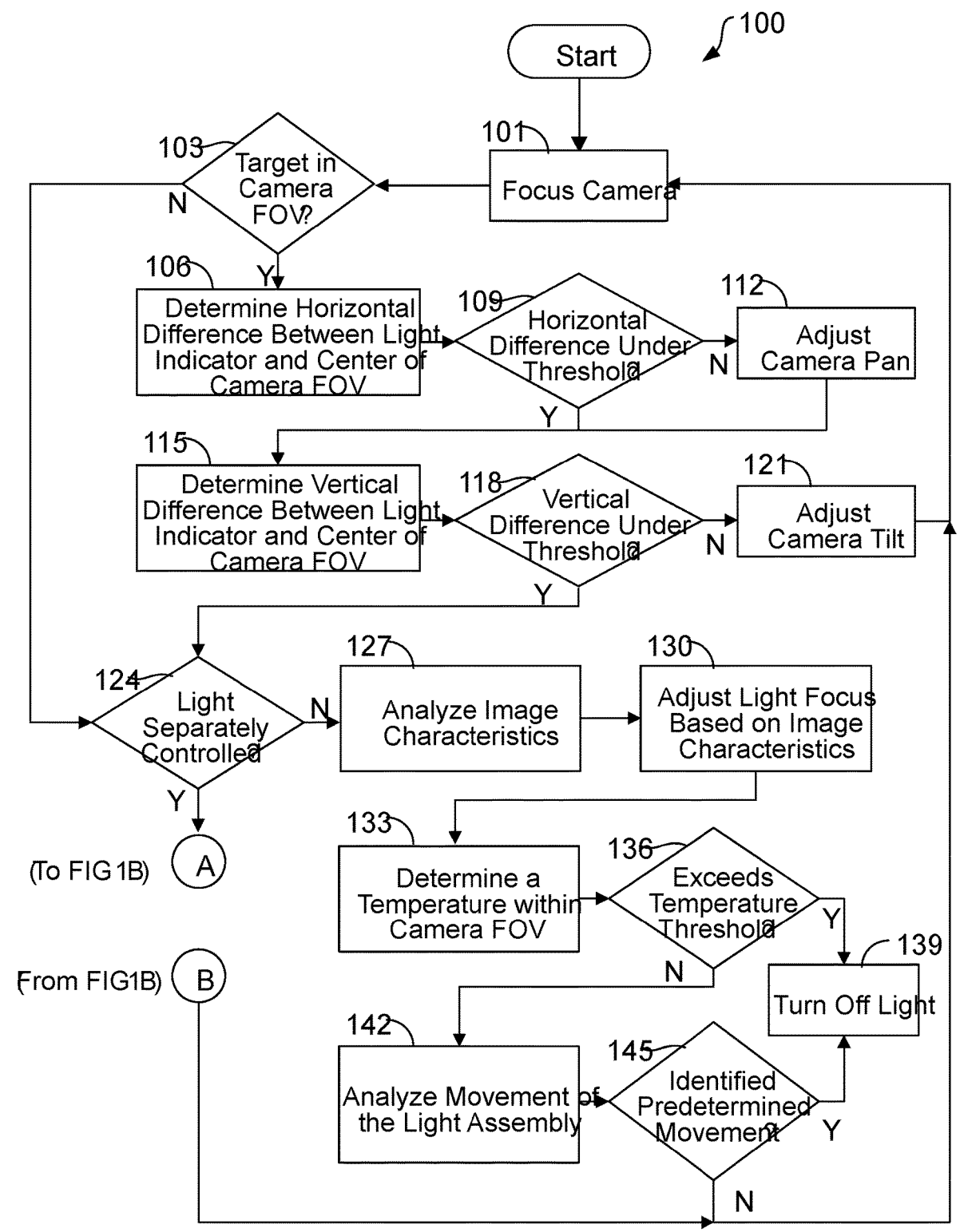
FIGS. 7A and 7B illustrates a flow diagram for the pan-tilt adjustment of the tracking lighting system to maintain a light beam on a targeted object according to the disclosure.
Figure 7B:
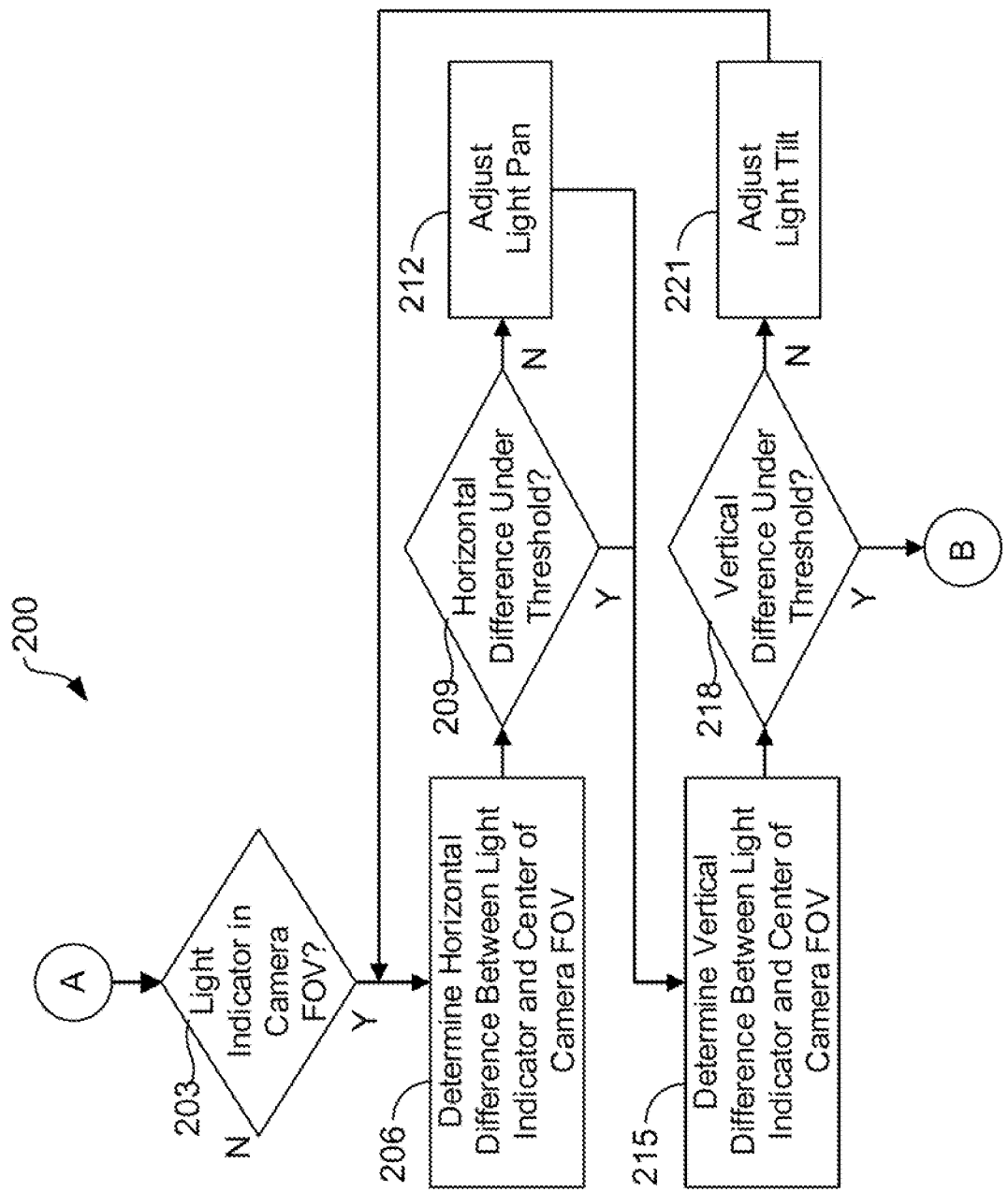
Figure 8:
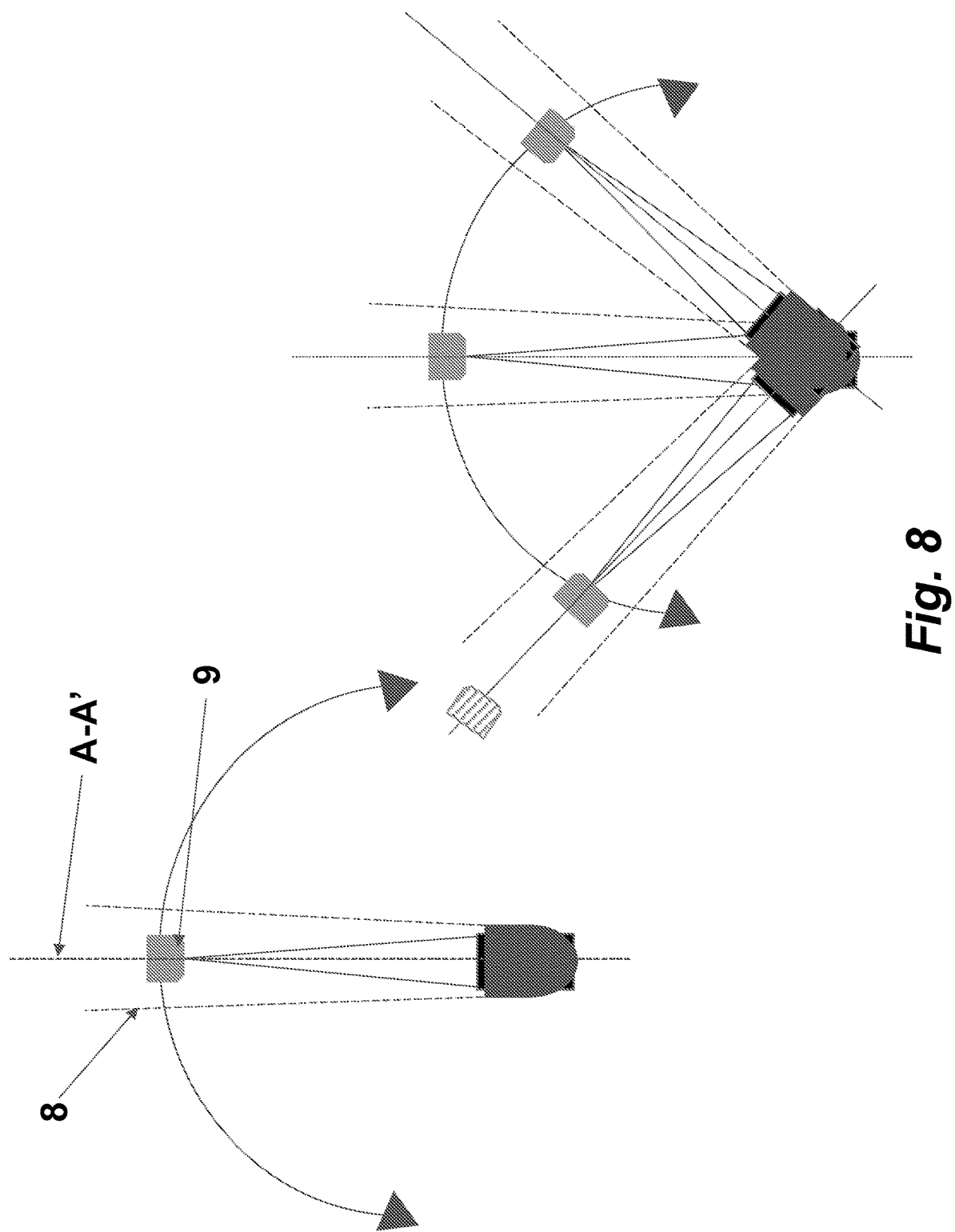
FIG. 8 schematically illustrates panning of the tracking lighting system in response to the movement of a trackable position indicator according to the disclosure.
Figure 9:
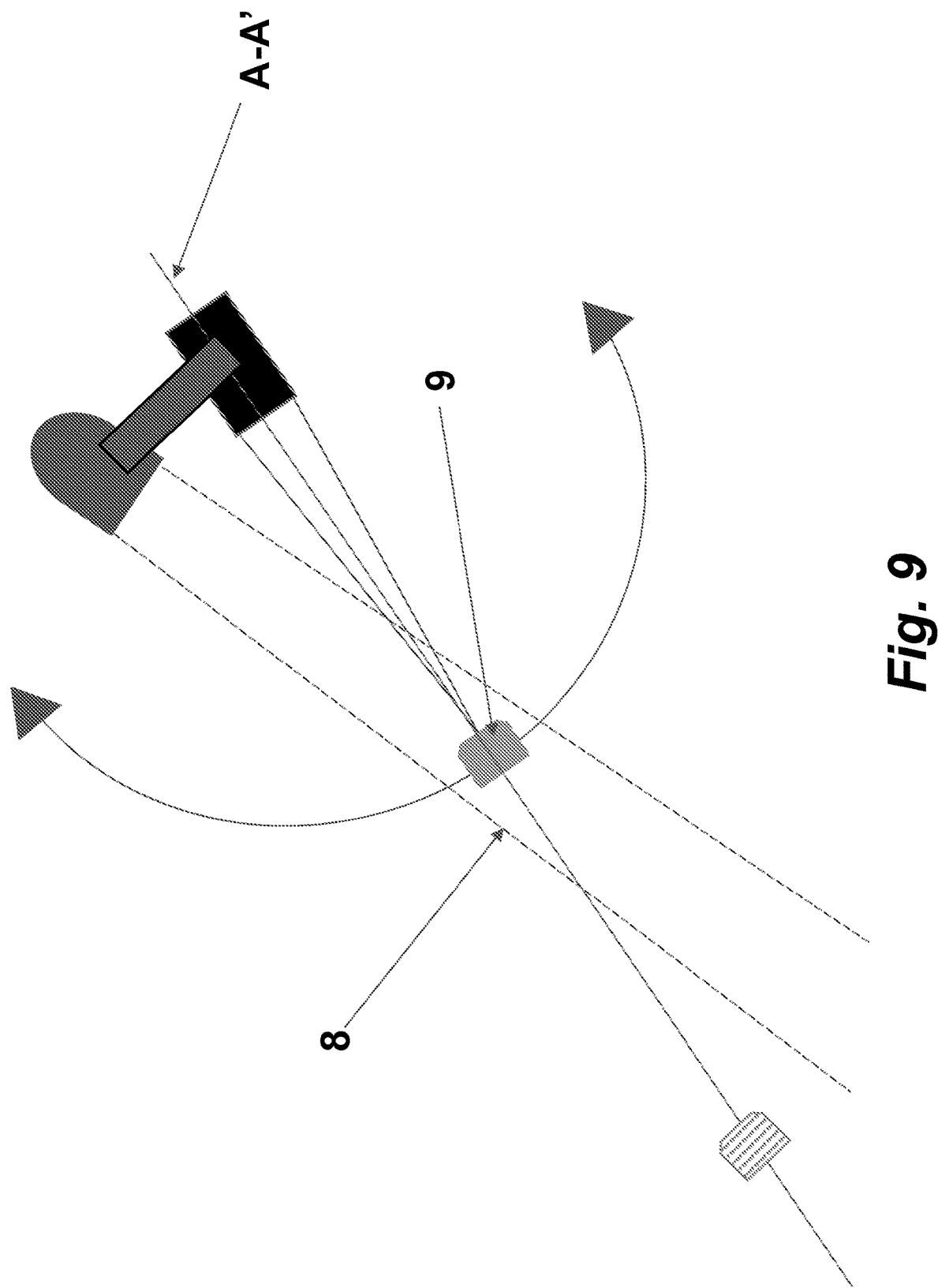
FIG. 9 schematically illustrates tilting of the tracking lighting system in response to the movement of a trackable position indicator according to the disclosure.
Figure 10:
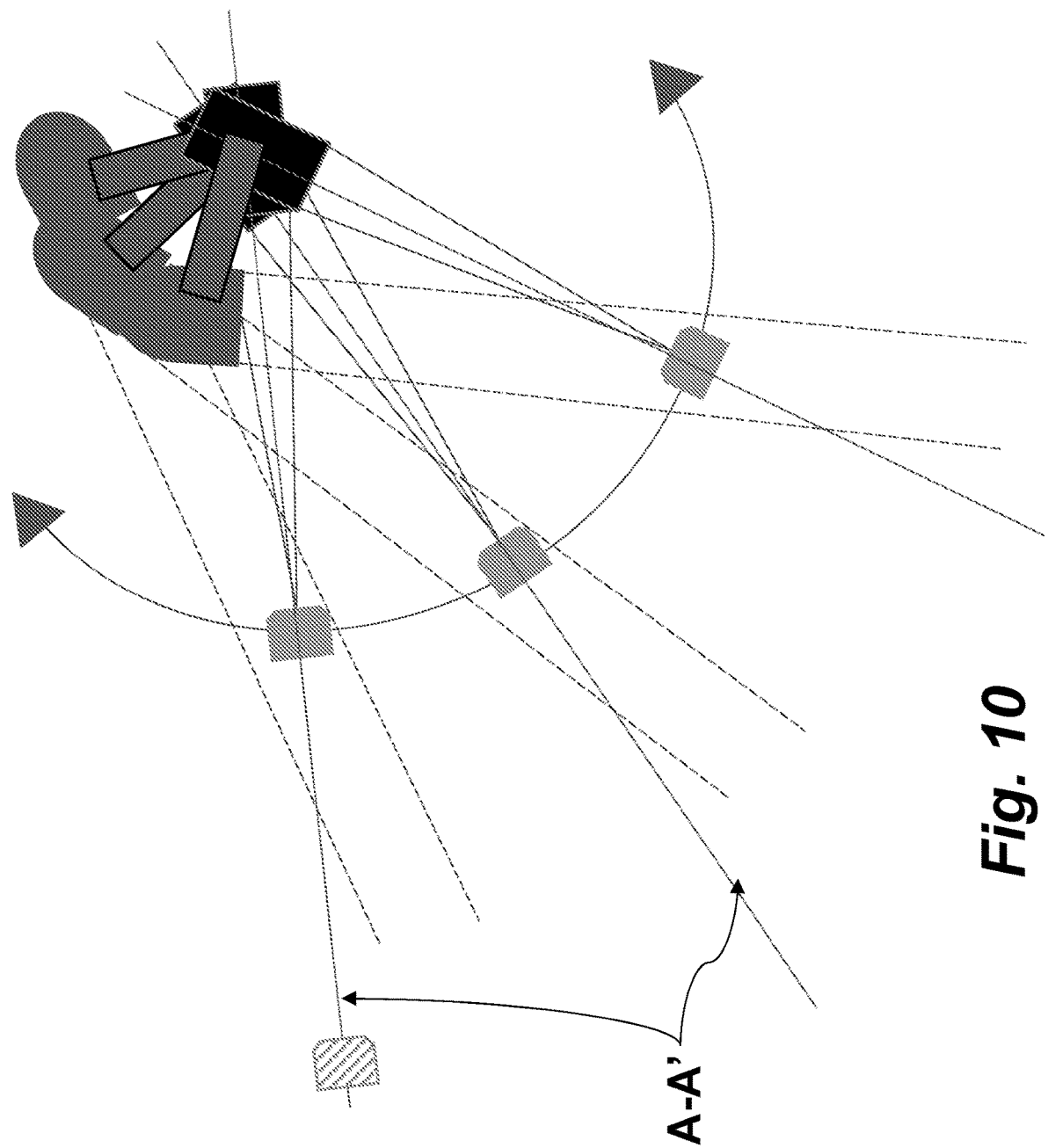
FIG. 10 schematically illustrates tilting of the tracking lighting system in response to the movement of a trackable position indicator according to the disclosure.

The computer-based digital control unit 16 can be configured with software such as according to the flow-diagram of FIGS. 7A and 7B that acquires the digital image generated by the digital image sensor 4 and the lens module 5, identifies within the image the position of the position indicator 9 and generates an electrical signals conducted to the geared servo moto system 22 adapted for tilting the housing 2 and the panning geared servo moto system 18 shown in FIG. 4. The digital signals generated by the computer-based digital control unit 16 adjust the movement of the housing 2 in both tilting and panning planes relative to the position of the mounting pole 11 by means of the geared servo moto systems 22 and 18 to centrally position the image of the position indicator 9 within the image generated by the digital camera system and in the optical axis A-A' of the lens module 5. Such adaptive movement then directs the light beam 8 onto the current position of the position indicator 9. Subsequent movement of the targeted object having the positional indicator 9 attached thereto, as shown in FIGS. 8-10, results in the computer-based digital control unit 16 reacquiring the image of the positional indicator 9, adjusting the panning and tilting of the housing 2 to redirect the lamp again onto the positional indicator 9, thereby maintaining illumination of the targeted object.

Figure 11:
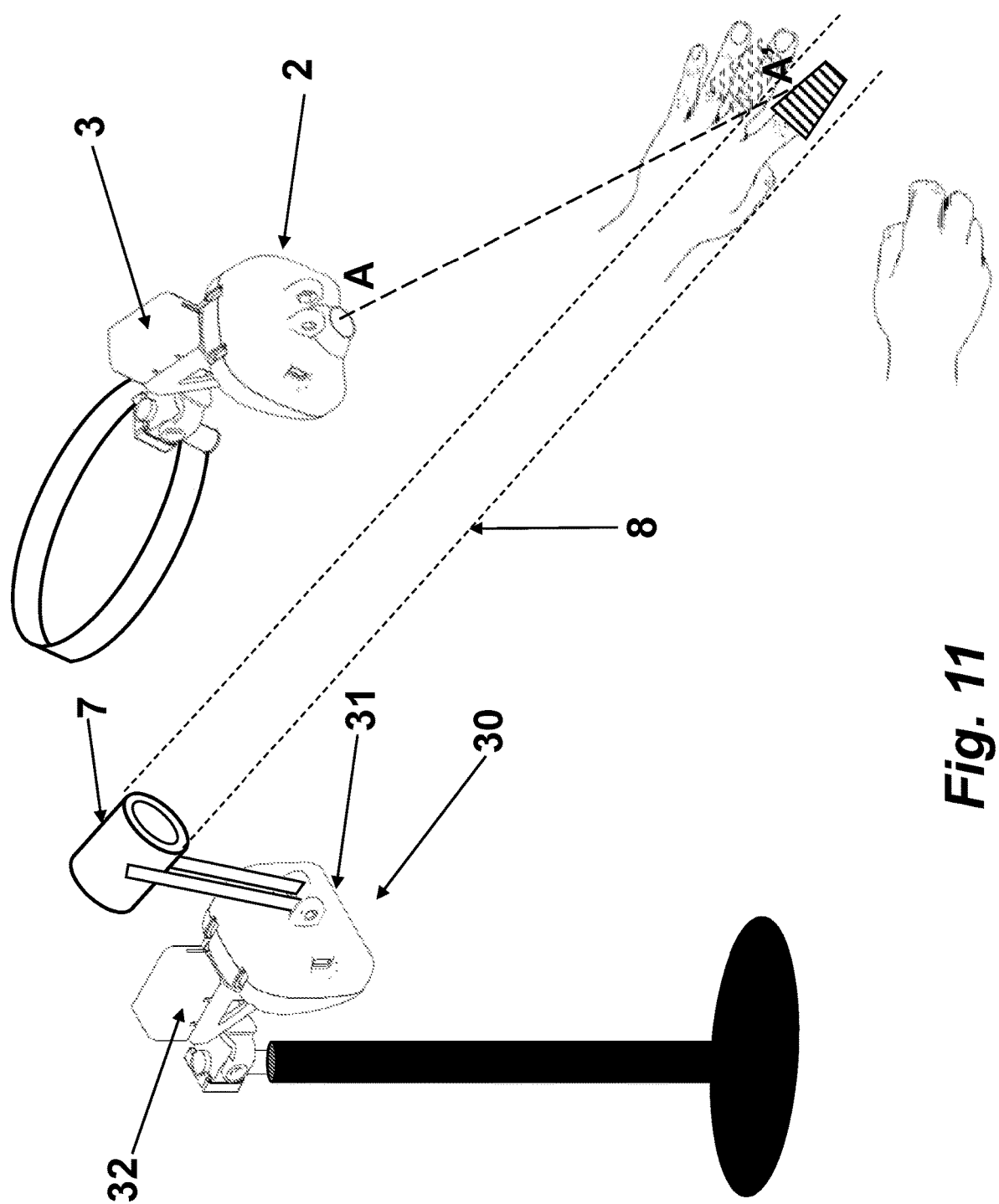
FIG. 11 illustrates an embodiment of a tracking lighting system of the disclosure having a light assembly mounted to a floor stand wherein the lamp is mounted on panning-tilting mechanism and is position-adjustable according to instructions from the computer-based digital control unit within the pan-tilt adjustable housing enclosing the digital imaging system.

Referring now to FIG. 11, in one embodiment of the tracking light system 1 of the disclosure a lamp assembly 30 comprising the lamp 7 is mounted on a second pan-tilt mechanism 32 connected to a pan-tilt adjustable housing 31 that may wirelessly or by cable receive instructions from the computer-based digital control unit 16 to direct a light beam 8 onto the current position of the position indicator 9 as determined by the digital imaging system and the computer-based digital control unit 16. The lamp assembly 30 can be mounted to a floor stand, wall mounted or to any other means that allows the emitted light beam 8 to be directed to the position indicator while not being carried by an individual also supporting the pan-tilt adjustable housing 2 and digital imaging system and the computer-based digital control unit 16.

Accordingly, one aspect of the disclosure encompasses embodiments of a tracking lamp system comprising: a digital imaging system enclosed in a pan-tilt adjustable housing operably connected to a first panning-tilting mechanism, the digital imaging system comprising a digital image sensor and a lens module, wherein the lens module comprises at least one lens, wherein the digital imaging system and the first panning-tilting mechanism can be operably connected to a computer-based digital control unit; a lamp fixedly mounted on the pan-tilt adjustable housing and positioned to direct a light beam to intersect the optical axis of the lens of the digital imaging system or fixedly mounted on a second panning-tilting mechanism not attached to the pan-tilt adjustable housing; and a position indicator recognizable by the computer-based digital control unit, wherein the computer-based digital control unit can be configured for processing digital data from the digital imaging sensor to generate a digital image, recognizing a position indicator within the digital image, directing the optical axis of the lens to intersect the position indicator by pan-tilt adjusting the pan-tilt adjustable housing, and optionally storing the digital image or video generated by the computer-based digital control unit.

In some embodiments of this aspect of the disclosure, at least one of the shape and color of the position indicator can be recognizable by the computer-based digital control unit.

In some embodiments of this aspect of the disclosure, the position indicator can be on a finger or a tool desired to be tracked.

In some embodiments of this aspect of the disclosure, the position indicator can provide a light signal recognizable by the computer-based digital control unit.

In some embodiments of this aspect of the disclosure, the position indicator can be at least one LED light.

In some embodiments of this aspect of the disclosure, the position indicator can be at least one LED light emitting near infra-red light detectable by the digital imaging system.

In some embodiments of this aspect of the disclosure, the pan-tilt adjustable housing can comprise a near infra-red light emitter configured to illuminate the position indicator recognizable by the computer-based digital control unit.

In some embodiments of this aspect of the disclosure, the lens of the digital imaging system can be non-adjustable.

In some embodiments of this aspect of the disclosure, the lens of the digital imaging system can be adjustable to change at least one of the focal point and the focal length.

In some embodiments of this aspect of the disclosure, the lamp can be focusable to concentrate light emitted from the lamp to a position distant from the pan-tilt adjustable housing.

In some embodiments of this aspect of the disclosure, the tracking lamp can further comprise a mounting for attaching the pan-tilt adjustable housing and the first panning-tilting mechanism to a headband.

In some embodiments of this aspect of the disclosure, the tracking lamp system can further comprise a mounting for attaching the pan-tilt adjustable housing and the first panning-tilting mechanism to a support stand.

In some embodiments of this aspect of the disclosure, the support stand can be wall-mounted.

In some embodiments of this aspect of the disclosure, the support stand can be a floor stand.

In some embodiments of this aspect of the disclosure, the lamp can be operably connected to the computer-based digital control unit.

In some embodiments of this aspect of the disclosure, the lamp can be operably wirelessly connected to the computer-based digital control unit.

In some embodiments of this aspect of the disclosure, the lamp can be mounted to a second panning-tilting mechanism not attached to the pan-tilt adjustable housing, and wherein the second panning-tilting mechanism can be pan-tilt adjustable in response to the computer-based digital control unit.

In some embodiments of this aspect of the disclosure, the lamp can be focusable in response to the computer-based digital control unit.

Another aspect of the disclosure encompasses embodiments of a computer-implemented method for directing a tracking light, comprising: generating a digital image file of a detectable indicator with a client digital imaging system enclosed in a pan-tilt adjustable housing; receiving a media file from a client digital imaging system; identifying an image of a detectable indicator within the field of view of the digital imaging system; determining the detected horizontal difference between the detected indicator and the center of the digital imaging system field of view; directing a panning mechanism to pan the pan-tilt adjustable housing to reduce said determined horizontal difference to below a threshold value; determining the detected vertical difference between the detected indicator and the center of the digital imaging system field of view; and directing a tilting mechanism to tilt the pan-tilt adjustable housing to reduce said determined vertical difference to below a threshold value, thereby directing the lamp to illuminate the detected indicator.

In some embodiments of this aspect of the disclosure, the lamp can be mounted on the pan-tilt adjustable housing, thereby panning and tilting with the digital imaging system.

In some embodiments of this aspect of the disclosure, the lamp can be moveable relative to the pan-tilt adjustable housing to the digital camera, said method further comprising the steps of: determining the detected horizontal difference between the detected indicator in the center of the digital imaging system field of view and the light from the lamp; directing a panning mechanism to pan the lamp to reduce said determined horizontal difference to below a threshold value; determining the detected vertical difference between detected indicator the in the center of the digital imaging system field of view and the light from the lamp; and directing a tilting mechanism to tilt the lamp to reduce said determined vertical difference to below a threshold value, thereby directing the lamp to illuminate the detected indicator.

In some embodiments of this aspect of the disclosure, the step of identifying the detectable indicator can comprise identifying at least one of the shape, the color, an emitted light, or a reflected light of the indicator.

What is claimed:

1. A tracking lamp system comprising:
    a digital imaging system enclosed in a pan-tilt adjustable housing operably connected to a first panning-tilting mechanism, the digital imaging system comprising a digital image sensor and a lens module, wherein the lens module comprises at least one lens, wherein the digital imaging system and the first panning-tilting mechanism are operably connected to a computer-based digital control unit;
    a lamp fixedly mounted on the pan-tilt adjustable housing and positioned to direct a light beam to intersect the optical axis of the lens of the digital imaging system or fixedly mounted on a second panning-tilting mechanism not attached to the pan-tilt adjustable housing; and
    a position indicator recognizable by the computer-based digital control unit,
wherein the computer-based digital control unit is configured for processing digital data from the digital imaging sensor to generate a digital image, recognizing a position indicator within the digital image, directing the optical axis of the lens to intersect the position indicator by pan-tilt adjusting the pan-tilt adjustable housing, and optionally storing the digital image or video generated by the computer-based digital control unit.

2. The tracking lamp system of claim 1, wherein at least one of the shape and color of the position indicator is recognizable by the computer-based digital control unit.

3. The tracking lamp system of claim 1, wherein the position indicator is on a finger or a tool desired to be tracked.

4. The tracking lamp system of claim 1, wherein the position indicator provides a light signal recognizable by the computer-based digital control unit.

5. The tracking lamp system of claim 4, wherein the position indicator is at least one LED light.

6. The tracking lamp system of claim 4, wherein the position indicator is at least one LED light emitting near infra-red light detectable by the digital imaging system.

7. The tracking lamp system of claim 1, wherein the pan-tilt adjustable housing comprises a near infra-red light emitter configured to illuminate the position indicator recognizable by the computer-based digital control unit.

8. The tracking lamp system of claim 1, wherein the lens of the digital imaging system is non-adjustable.

9. The tracking lamp system of claim 1, wherein the lens of the digital imaging system is adjustable to change at least one of the focal point and the focal length.

10. The tracking lamp system of claim 1, wherein the lamp is focusable to concentrate light emitted from the lamp to a position distant from the pan-tilt adjustable housing.

11. The tracking lamp system of claim 1, further comprising a mounting for attaching the pan-tilt adjustable housing and the first panning-tilting mechanism to a headband.

12. The tracking lamp system of claim 1, further comprising a mounting for attaching the pan-tilt adjustable housing and the first panning-tilting mechanism to a support stand.

13. The tracking lamp system of claim 12, wherein the support stand is wall-mounted.

14. The tracking lamp system of claim 13, wherein the lamp is mounted to a second panning-tilting mechanism not attached to the pan-tilt adjustable housing, and wherein the second panning-tilting mechanism is pan-tilt adjustable in response to the computer-based digital control unit.

15. The tracking lamp system of claim 12, wherein the support stand is a floor stand.

16. The tracking lamp system of claim 1, wherein the lamp is operably connected to the computer-based digital control unit.

17. The tracking lamp system of claim 16, wherein the lamp is operably wirelessly connected to the computer-based digital control unit.

18. The computer-implemented method of claim 17, wherein the lamp is moveable relative to the pan-tilt adjustable housing to the digital camera, said method further comprising the steps of:
    determining the detected horizontal difference between the detected indicator in the center of the digital imaging system field of view and the light from the lamp;
    directing a panning mechanism to pan the lamp to reduce said determined horizontal difference to below a threshold value;
    determining the detected vertical difference between detected indicator the in the center of the digital imaging system field of view and the light from the lamp; and
    directing a tilting mechanism to tilt the lamp to reduce said determined vertical difference to below a threshold value, thereby directing the lamp to illuminate the detected indicator.

19. The tracking lamp system of claim 16, wherein the lamp is focusable in response to the computer-based digital control unit.

20. A computer-implemented method for directing a tracking light, comprising:
    generating a digital image file of a detectable indicator with a client digital imaging system enclosed in a pan-tilt adjustable housing;
    receiving a media file from a client digital imaging system;
    identifying an image of a detectable indicator within the field of view of the digital imaging system;
    determining the detected horizontal difference between the detected indicator and the center of the digital imaging system field of view;
    directing a panning mechanism to pan the pan-tilt adjustable housing to reduce said determined horizontal difference to below a threshold value;
    determining the detected vertical difference between the detected indicator and the center of the digital imaging system field of view; and
    directing a tilting mechanism to tilt the pan-tilt adjustable housing to reduce said determined vertical difference to below a threshold value, thereby directing the lamp to illuminate the detected indicator.

21. The method of claim 20, wherein the lamp is mounted on the pan-tilt adjustable housing, thereby panning and tilting with the digital imaging system.

22. The method of claim 20, wherein the step of identifying the detectable indicator comprises identifying at least one of the shape, the color, an emitted light, or a reflected light of the indicator.

* * * * *